UNITED STATES PATENT OFFICE.

NATHL. C. TOWLE, OF WASHINGTON, DISTRICT OF COLUMBIA.

IMPROVEMENT IN TANNING.

Specification forming part of Letters Patent No. 8,406, dated October 7, 1851.

*To all whom it may concern:*

Be it known that I, NATHANIEL C. TOWLE, of the city of Washington, District of Columbia, have invented or discovered a new and useful Improvement in the Art of Tanning Skins and Hides, either with or without the wool, hair, or fur, and in preparing parchments or other manufactures of skins and hides; and I do hereby declare that the following is a full and exact description thereof.

The nature of my invention or new and useful improvement consists in the use or application of arsenic or arsenious acid to skins and hides during the process of tanning or otherwise preparing them by any of the known processes for various useful purposes.

The effect of the arsenic is to preserve and give a permanent tone and strength to the animal fiber and to retard its tendency to decomposition. The effect is to be produced by immersing the hides or skins in a solution of arsenic in water, made sufficiently strong to accomplish the object. If one pound of arsenic be dissolved in one hundred gallons of water, at a temperature of about 100° Fahrenheit, it will be sufficient for ordinary purposes. The skins or hides should be immersed in the solution about twenty-four hours, if used when the skins are fresh, or before they have undergone other processes, which is deemed the most favorable period. If used after the liming process, the arsenic may be added to the usual bating-liquor, and a similar effect will be produced, or it may succeed the bating process.

The peculiar properties of arsenic by which it tends to suspend the natural tendency of the animal fiber to decomposition upon the extinction of animal life are well known, and of course they are not patentable; but their application to the processes of tanning and otherwise preparing skins and hides for useful purposes by which they are rendered stronger and more durable, is believed not to have been heretofore known and used. I do not therefore intend to limit my claim to any particular mode or period of using the article, but I shall apply it in such form or in such strength of solution as the nature of the case may require to effect the objects named.

Workmen should guard against the absorption of the poisonous qualities of the arsenic while immersing or handling the skins in the liquor by using tools or wearing india-rubber gloves.

After the skins are taken out of the liquor and rinsed thoroughly the danger ceases.

What I claim as my invention or discovery as a new and useful improvement, and desire to secure by Letters Patent, is—

The use of arsenic or arsenious acid, substantially in the manner and for the purposes herein set forth.

N. C. TOWLE.

Witnesses:
    B. B. FRENCH,
    H. H. SYLVESTER.